Patented June 6, 1950

2,510,642

UNITED STATES PATENT OFFICE 2,510,642

PREPARATION OF ORGANO-SILICON HALIDES

Robert H. Krieble, Schenectady, N. Y., assignor to General Electric Company, a corporation of New York No Drawing. Application April 8, 1947, Serial No. 740,262

8 Claims. (Cl. 260—448.2)

This invention relates to the preparation of organosilicon compounds and, more particularly, to the production of hydrocarbon-substituted halogenosilanes.

The present invention is based on my discovery that hydrocarbon-substituted halogenosilanes can be prepared by effecting reaction in the liquid phase at a temperature of from about 0° to 150° C. in the presence of a catalyst for the reaction between (1) a compound corresponding to the general formula HC≡CR where R is a member selected from the class consisting of hydrogen and monovalent hydrocarbons and (2) a silicon compound containing at least one hydrogen and at least one halogen attached directly to the silicon atom, the remaining valences of the silicon being satisfied by a member of the group consisting of hydrogen, monovalent hydrocarbon radicals and halogens until all the valences of the silicon are satisfied.

For purposes of brevity, the compound defined in (1) above will be referred to hereinafter as the "hydrocarbon" and the silicon compound defined in (2) above will be referred to as the "silicon hydride."

It was known prior to my invention that hydrocarbon halides could be caused to react with silicon to yield organohalogenosilanes. For example, in Rochow Patent 2,380,995, issued August 7, 1945, and assigned to the same assignee as the present invention, hydrocarbon halides are caused to react at elevated temperatures of the order of from about 200° to 500° C. with silicon, preferably in the presence of a metallic catalyst, to yield hydrocarbon-substituted halogenosilanes.

It was also known heretofore that hydrocarbon-substituted halogenosilanes could be prepared by effecting reaction in the vapor phase at highly elevated temperatures of the order of at least 450° C. between a hydrocarbon and a silicon halide, more particularly, silicon tetrachloride. By means of this reaction a hydrogen halide is split off to yield the hydrocarbon-substituted halogenosilane, the valence bond formerly bonding the removed hydrogen to the hydrocarbon now bonding the hydrocarbon to the silicon atom by means of a C—Si bond.

I have now discovered that I can prepare by direct synthesis hydrocarbon-substituted halogenosilanes easily and cheaply using much lower temperatures of reaction than has previously been possible by causing a hydrocarbon of the general formula HC≡CR where R has the meaning given above (e. g., R may be an alkyl radical, for instance, methyl, ethyl propyl, isopropyl, butyl, etc.; aryl radical, for instance, phenyl, naphthyl, etc.; aralkyl, for instance, benzyl, phenylethyl, etc.; alkaryl, for instance, tolyl, ethylphenyl, etc.) to react with a silicon compound containing a hydrogen and a halogen attached directly to the silicon atom, the remaining valences of the silicon being satisfied by a member of the group consisting of hydrogen, monovalent hydrocarbon radicals and halogens.

In accordance with my invention, I effect the reaction between the reactants at a temperature of from about 0° to 150° C. with at least a part of the reactants in the liquid phase and in the presence of a catalyst or promoter for the reaction. By means of these conditions of reaction, I can cause the hydrogen attached directly to the silicon hydride to add across the triple bond of the above-described hydrocarbon compound without losing any atom of either the hydrocarbon or silicon hydride through the formation of by-products.

It was entirely unexpected and in no way could have been predicted that the aforementioned reaction would proceed in accordance with the above description since it was found that such compounds, for example, $SiCl_4$, $SiBr_4$, $CH_3SiBr_3$, and $(CH_3)_2SiBr_2$ did not add to unsaturated hydrocarbons under the aforementioned conditions of reaction. This also was contrary to the teachings of Kharasch et al., who showed, for example, that carbon tetrachloride, bromotrichloromethane, carbon tetrabromide, and bromoform would all react with olefins to give hydrocarbon-substituted halogenomethanes (see, for example, Kharasch, Urry and Reinmuth, Abstracts of the 109th Meeting of the American Chemical Society, page 6M: Kharasch, Jensen and Urry, Journal of the American Chemical Society, 68, 154 (1946)).

The general reaction embraced by my claimed invention is carried out in the presence of a peroxy catalyst for the reaction which is preferably soluble in one of the reactants. The catalyst may be described generally as one which is ordinarily employed as a polymerization catalyst for vinyl compounds and which is preferably capable of supplying free radicals, e. g., alkyl radicals, aryl radicals, etc. Among such catalysts may be mentioned, for example, aliphatic acyl peroxides, for instance, diacetyl peroxide, lauryl peroxide, stearyl peroxide, caprylyl peroxide, di-(methyl maleoyl) peroxide, etc.; peroxides of the aromatic series, for instance, dibenzoyl peroxide, 3,4-dichlorobenzoyl peroxide, etc.; mixed aliphatic and aromatic peroxides, for instance, acetyl benzoyl peroxide, etc.; organic hydroperoxides, for instance, secondary-butyl hydroperoxide, tertiary-butyl hydroperoxide, 1-hydroxycyclohexyl hydroperoxide-1, etc.; various organic per-compounds, for instance, di-(tertiary-butyl perphthalate), di-(tertiary-butyl persuccinate), di-(tertiary-butyl peradipate), tertiary-butyl perfuroate, tertiary-butyl perbenzoate, etc.; dihydrocarbon peroxides, for instance, diethyl peroxide, ethylbutyl peroxide, di-(tertiary-butyl) peroxide, dibenzal diperoxide, etc.; other peroxides, such as ascaridole, cyclohexanone peroxide, urea hydrogen peroxide, diheptanol peroxide, etc. Diacetyl and dibenzoyl peroxides are the preferred catalysts.

Any suitable amount of catalyst may be used, but in general the catalyst concentration will be in the range of from about 0.01 to 1 or more mols catalyst per mol hydrocarbon, preferably from 0.05 to 0.25 mol catalyst per mol hydrocarbon. The amount of catalyst employed will vary depending, e. g., on the amount of inhibitory impurities in the reactants, type of reactants, etc. Although ultra-violet light causes the formation of the organo-silicon compounds, I prefer to use preformed catalysts of the type disclosed above. The use of Friedel-Crafts catalysts, for example, aluminum chloride, etc., should be avoided since they tend to cause the formation of excessive amounts of undesirable by-products with a subsequent reduction in yield of the desired product.

The reaction between the hydrocarbon and the silicon hydride may be carried out in several ways. One method comprises adding the silicon hydride and the catalyst to a pressure reactor capable of being heated and preferably provided with a means of agitation. Thereafter the hydrocarbon is charged into the pressure reactor.

The pressure reactor or autoclave is heated or cooled, as the case may be, under autogenous pressure at a temperature of from about 0° to 150° C., preferably from about 60° to 120° C. Where the hydrocarbon and silicon hydride have sufficiently high boiling points, I may conduct the reaction at atmospheric pressure in an open reaction chamber. It is desirable to conduct the reaction under such conditions that the reactants and catalyst are in the same phase.

Although the length of time of heating the reaction mass is not critical, the exact time required will depend upon such factors as, for example, type of reactants employed, kind of catalyst, the temperature conditions maintained, type of product desired, etc. Usually, I have found that most of the reactions generally go to completion when the reaction mass is heated at temperatures of from about 60° to 120° C. for from about 4 to 36 hours, the preferred conditions of time and temperature being dependent, for example, on the particular catalyst employed.

At the conclusion of the reaction, the contents of the autoclave are removed and the components of the reaction mass separated as, for example, by fractional distillation. This method, i. e., fractional distillation, of separating the desired product from the reaction mass is particularly amenable to my type of reaction since the relatively low temperatures employed during the course of the reaction prevent the formation of undesirable by-products which might interfere with the separation of the desired product and recovery of the unreacted materials.

The proportions of hydrocarbon and the silicon hydride employed in my claimed process may be varied within wide limits depending upon the type of product desired. I prefer to employ at least 2 mols, for example, from about 2 to 6 or more mols, of the silicon hydride per mol of the hydrocarbon. It will be apparent that where it is desired to prepare, for instance, vinyltrichlorosilane, I may use a large molar excess of acetylene.

In order that those skilled in the art may better understand how the present invention may be practiced, the following specific examples are given by way of illustration rather than by way of limitation.

*Example 1*

About 135.5 grams trichlorosilane and 12.2 grams di-benzoyl peroxide were placed in a glass-lined autoclave. The autoclave was then filled with acetylene to a pressure of 325 p. s. i. which was equivalent to about 13 grams acetylene. The autoclave was heated momentarily at a temperature of about 95° C. and then held at 80° C. for 24 hours. At the end of this time, the autoclave was cooled, the reaction mass removed and fractionally distilled to remove the individual reactants yielding a residue having a melting point of 27–28° C. and a boiling point of 202.5° C. Analysis of this compound showed it to contain 71.2 per cent chlorine (calculated 71.6 per cent) identifying it as bis-(trichlorosilyl) ethane having the structural formula

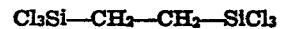

Cl₃Si—CH₂—CH₂—SiCl₃

The above-identified compound is a member of the generic group of compounds corresponding to the general formula

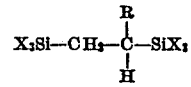

Where X is a halogen and R is a member of the group consisting of hydrogen and monovalent hydrocarbons.

*Example 2*

Bis-(dichloromethylsilyl) ethane having the structural formula

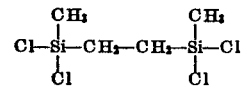

may be prepared by effecting reaction between acetylene and methyldichlorosilane (CH₃SiHCl₂) in the presence of an organic peroxide catalyst using the same apparatus and procedure as employed in Example 1.

In addition to the silicon hydrides employed above in the foregoing examples, other silicon hydrides containing a hydrogen and halogen attached directly to the silicon atom of the type described previously may also be employed, for example, inorganic silicon hydrides, for instance, SiHBr₃, SiHCl₂I, SiHFBr₂, SiHCl₂Br, SiH₂Cl₂, SiH₂Br₂, SiH₂BrCl, SiH₃Cl, Si₂H₄Cl₂, Si₂H₄Br₂, Si₂HBr₅, Si₂HCl₅, etc.; silicon halides containing a monovalent hydrocarbon radical connected directly to the silicon by a C—Si linkage, for example, CH₃SiHBr₂, CH₃SiHClI, (CH₃)₂SiHCl, CH₃SiHBrCl, C₃H₇SiHCl₂, C₅H₁₁SiHCl₂, C₆H₅HiHCl₂, C₇H₇SiHBr₂ (benzyldibromosilane), methyl phenylchlorosilane (CH₃SiHC₆H₅Cl), etc. The methods for preparing the various silicon compounds may be ascertained by reference to well-known books and articles on the subject. In the preferred embodiments of this invention, I employ silicon hydrides of the type disclosed above wherein at least two chlorine atoms and at least one hydrogen atom are attached directly to the silicon atom, e. g., $HSiCl_3$, $H_2SiCl_2$, methyldichlorosilane phenyldichlorosilane, etc.

Besides the acetylene employed in the above-described examples, I may use other compounds corresponding to the general formula $HC{\equiv}CR$ where R is a member of the class consisting of hydrogen and monovalent hydrocarbon radicals, for example, methyl acetylene (propyne or allylene), ethylacetylene (butyne), propylaceylene (pentyne), hexylacetylene (caprilidene), pentylacetylene (heptyne), tridecyne, phenylacetylene ($HC{\equiv}CC_6H_5$), etc. I prefer to use acetylene and compounds in the homologous series with acetylene wherein is contained only a single unsaturation, namely, the triple bond $HC{\equiv}C-$ and no other olefinic unsaturation.

It will be apparent to those skilled in the art that diluents may be employed in effecting reaction between the hydrocarbon and the silicon compound. However, I prefer to effect the reaction in the absence of such diluents in order to render the separation of the materials less difficult. The reaction should be carried out under anhydrous conditions in order to avoid hydrolysis of the organohalogenosilanes.

The materials obtained by the practice of my invention have many uses among them as intermediates in the preparation of silicone resins similar to those described, for example in Rochow Patents 2,258,218 and 2,258,220, issued October 7, 1941, and assigned to the same assignee as the present invention. They may also be employed for rendering water-repellent materials which are originally water-non-repellent in accordance with the process disclosed and claimed in Patnode Patent 2,306,222, issued December 2, 1942. Since the halogens attached to the silicons are readily reactable, high-boiling oils or plasticizers may be formed by hydrolyzing the materials per se or by reacting the active halogen atoms with alcohols or Grignard reagents.

What I claim as new and desire to secure by Letters Patent of the United States is:

1. The process for preparing an organohalogenosilane in which all the halogens in the said silane are attached directly to a silicon atom, which process comprises effecting reaction in the liquid phase between (1) a compound corresponding to the general formula $HC{\equiv}CR$ where R is a member of the class consisting of hydrogen and monovalent hydrocarbon radicals free of olefinic unsaturation and (2) a silicon hydride containing a hydrogen and a halogen attached directly to the silicon atom, the remaining valences of the silicon being satisfied by a member of the group consisting of hydrogen, monovalent hydrocarbon radicals, and halogens, the said reaction being effected at a temperature of from about 0° to 150° C. in the presence of a peroxy vinyl polymerization catalyst for the reaction.

2. The process for preparing compounds corresponding to the general formula

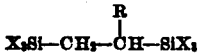

where X is a halogen and R is a member of the group consisting of hydrogen and monovalent hydrocarbon radicals, which process comprises effecting reaction in the liquid phase at a temperature of from about 0° to 150° C. in the presence of an organic peroxide between (1) a compound of the general formula $HC{\equiv}CR$ and (2) a compound of the general formula $SiHX_3$, where R and X have the same meanings as stated above, and R in addition is free of olefinic unsaturation.

3. The process for preparing an organohalogenosilane in which all the halogens in the said silane are attached directly to a silicon atom, which process comprises effecting reaction in the liquid phase between (1) acetylene and (2) a silicon hydride containing a hydrogen and a halogen attached directly to the silicon atom, the remaining valences of the silicon being satisfied by a member selected from the class consisting of hydrogen, monovalent hydrocarbon radicals, and halogens, the said reaction being effected at a temperature of from about 0° to 150° C. in the presence of a peroxy vinyl polymerization catalyst for the reaction.

4. The process for preparing an organohalogenosilane in which all the halogens in the said silane are attached directly to a silicon atom, which process comprises effecting reaction in the presence of an organic peroxide in the liquid phase at a temperature of from about 0° to 150° C. between (1) acetylene, and (2) a silicon hydride containing a hydrogen and a halogen attached directly to the silicon atom, the remaining valences of the silicon being satisfied by a member of the group consisting of hydrogen, monovalent hydrocarbon radicals, and halogens, the said reaction being effected in the presence of an organic peroxide.

5. The process for preparing bis-(trichlorosilyl) ethane which comprises effecting reaction in the liquid phase at a temperature of from about 0° to 150° C. between acetylene and trichlorosilane, the said reaction being effected in the presence of a peroxy vinyl polymerization catalyst for the reaction.

6. The process for preparing bis-(trichlorosilyl) ethane which comprises effecting reaction in the liquid phase at a temperature of from about 60° to 120° C. in the presence of benzoyl peroxide between acetylene and trichlorosilane and isolating bis-(trichlorosilyl) ethane from the reaction mass.

7. The process for preparing bis-(dichloromethylsilyl) ethane which comprises effecting reaction in the liquid phase at a temperature of from 0° to 150° C. between acetylene and methyldichlorosilane, the said reaction being effected in the presence of a peroxy vinyl polymerization catalyst for the reaction.

8. Bis-(dichloromethylsilyl) ethane.

ROBERT H. KRIEBLE.

REFERENCES CITED

The following references are of record in the file of this patent:

UNITED STATES PATENTS

| Number | Name | Date |
|---|---|---|
| 2,379,821 | Miller | July 3, 1945 |
| 2,407,181 | Scott | Sept. 3, 1946 |

OTHER REFERENCES

Volnov: "Jour. Gen. Chem.," U. S. S. R., vol. 10 (1940), pages 1600–1604.

Ellis: "Chemistry of Synethetic Resins," vol. 1 (1935), page 241, Reinhold, N. Y., publishers.